United States Patent Office 3,510,651
Patented May 5, 1970

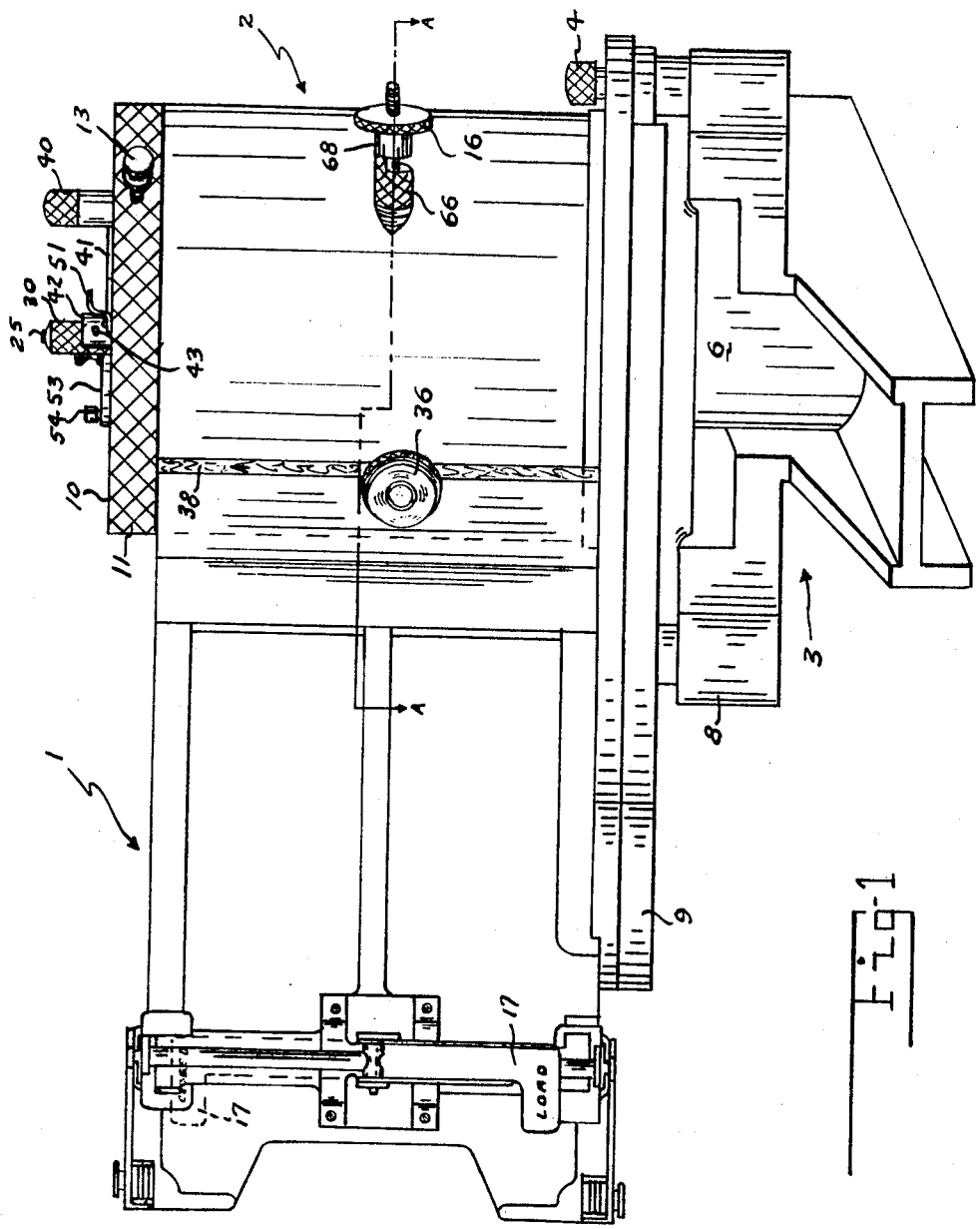

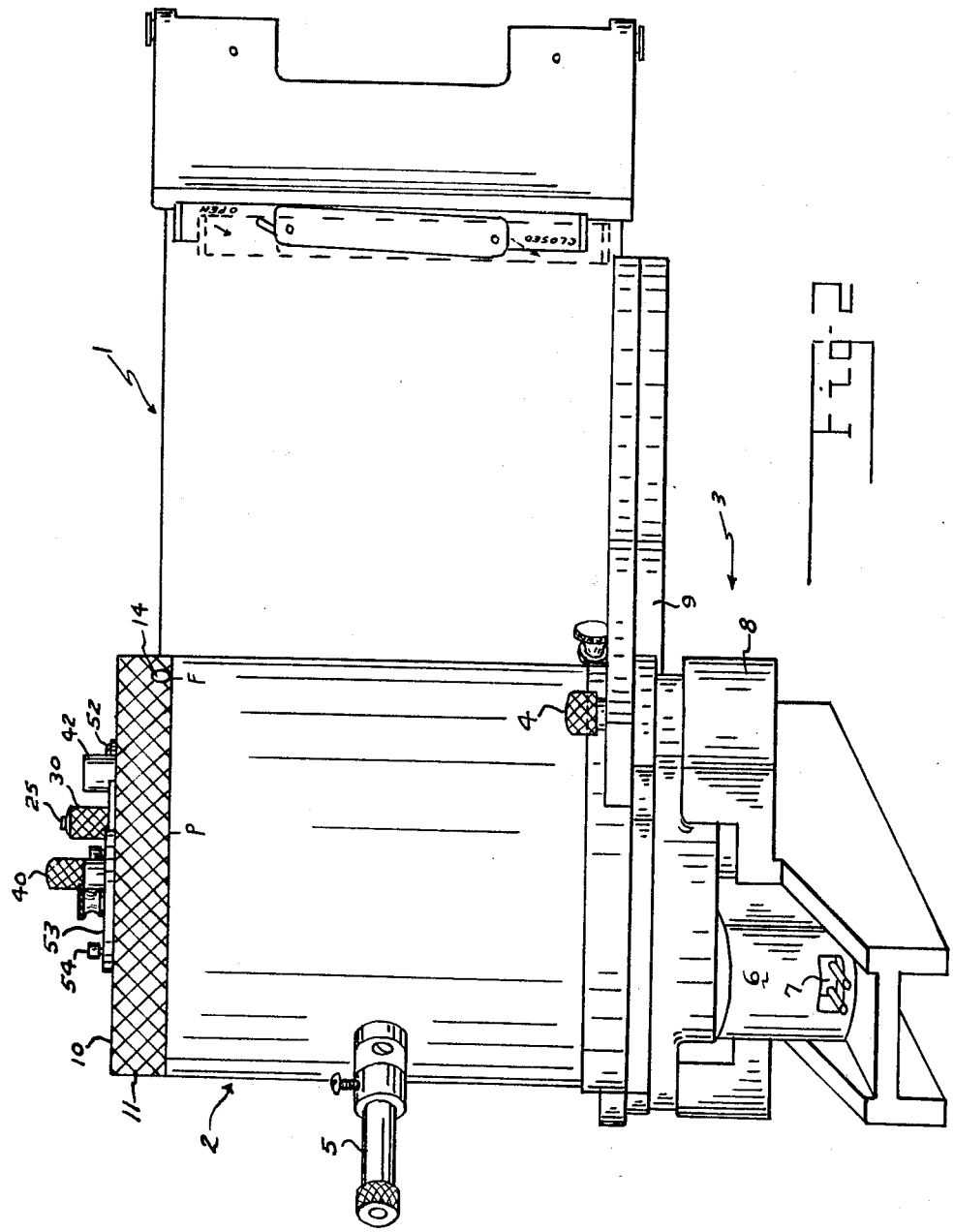

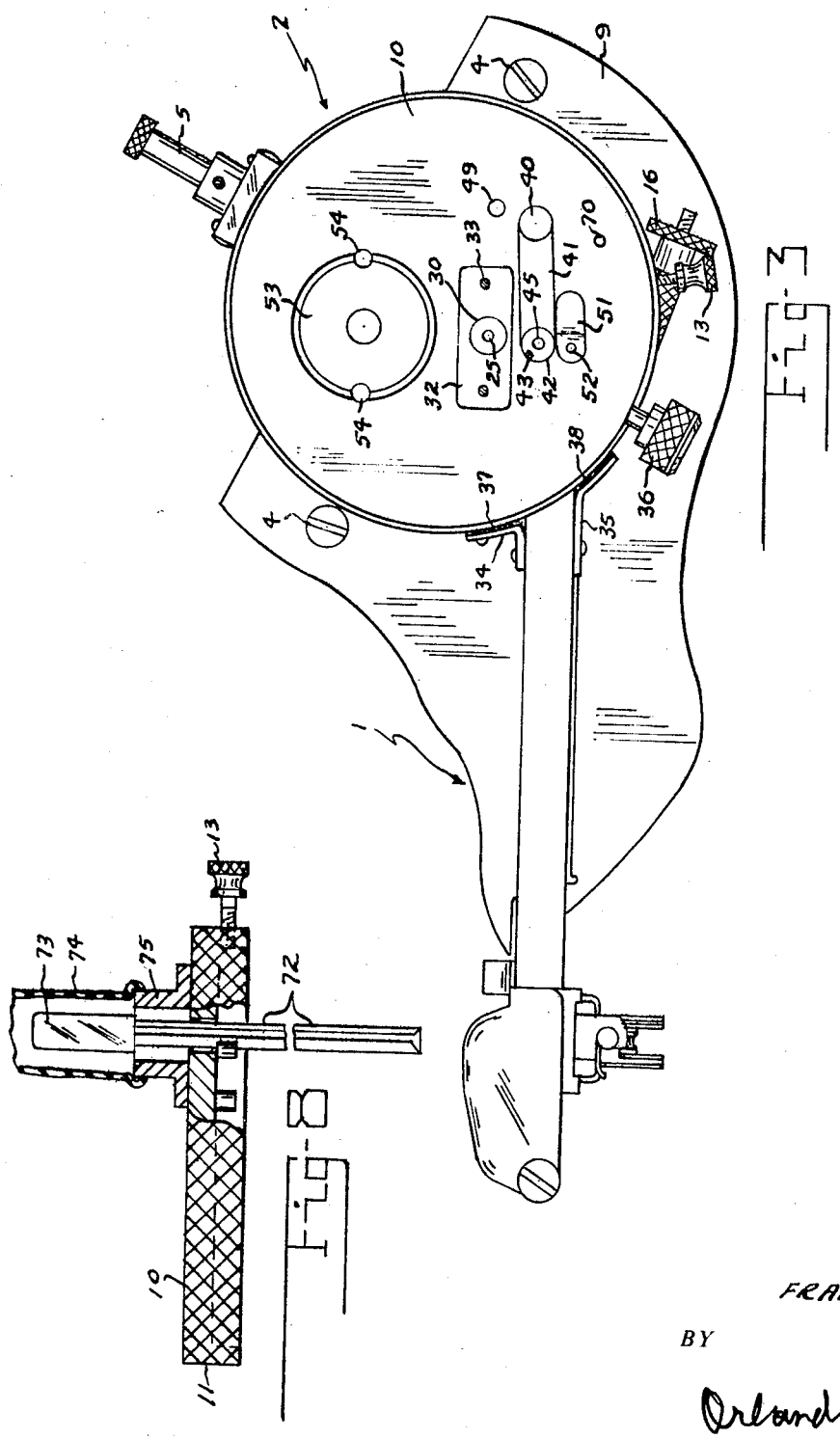

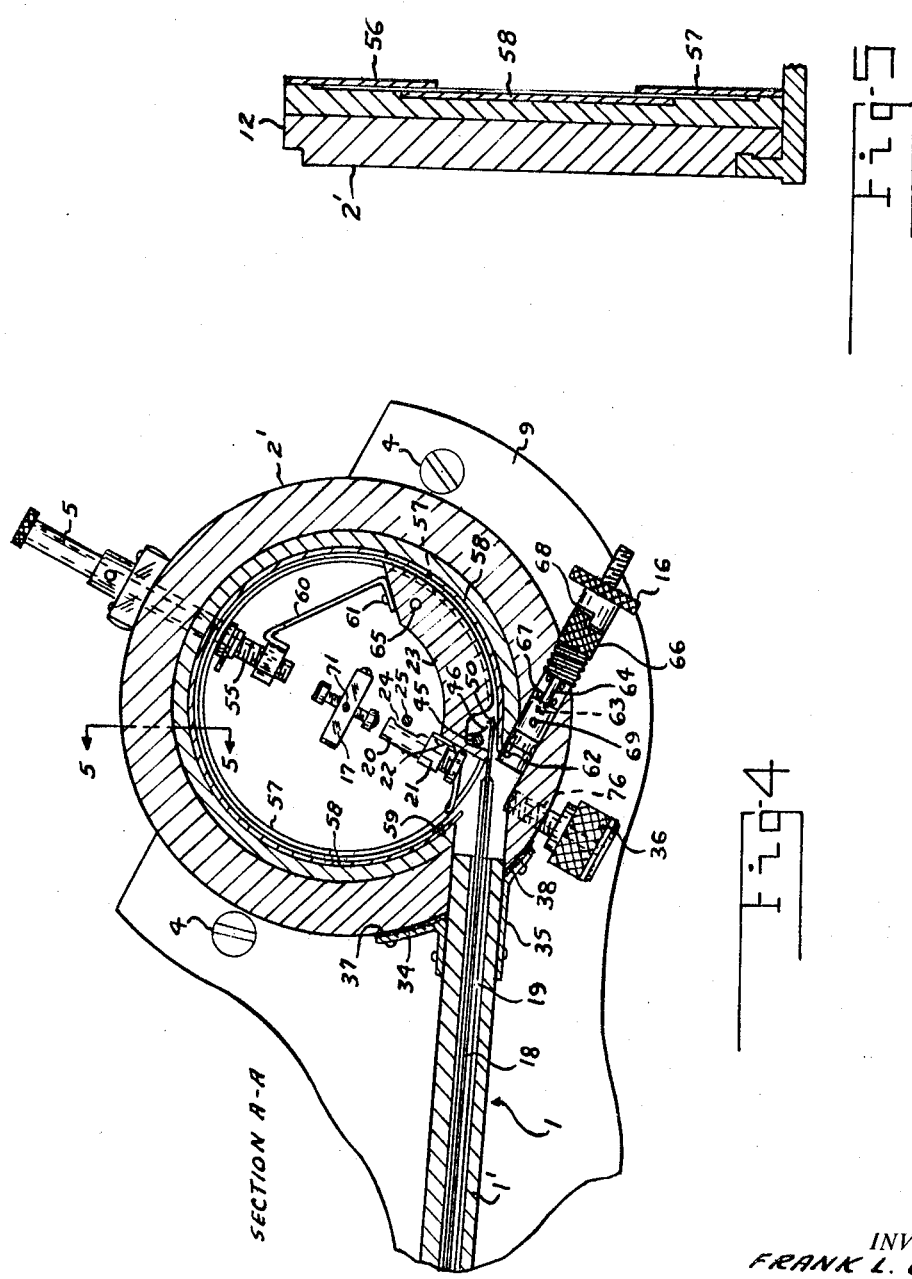

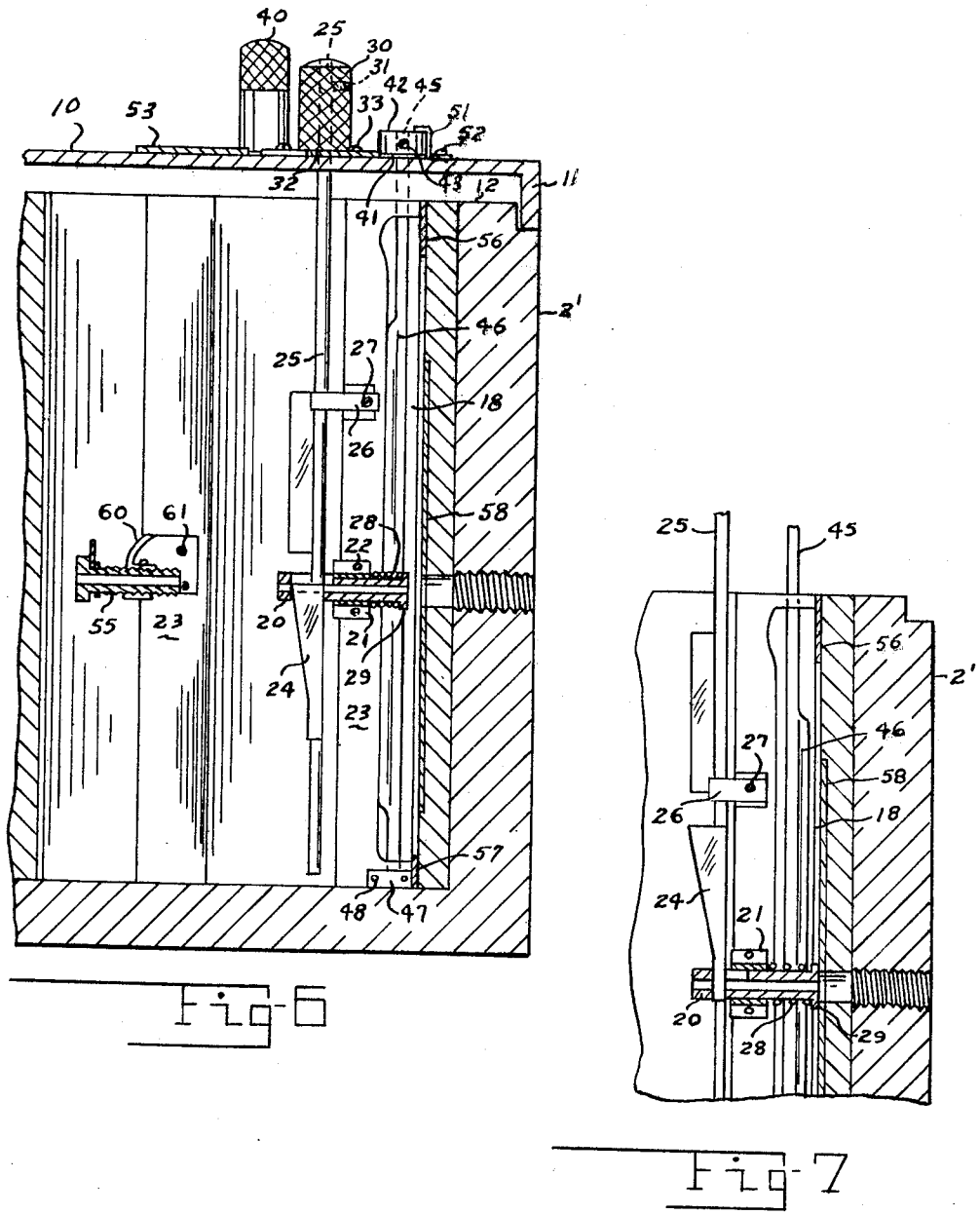

3,510,651
CYLINDRICAL X-RAY CASSETTE
FOR DRY PROCESS
Frank L. Chan, 3228 Ravenwood Road,
Fairborn, Ohio 45324
Filed Aug. 24, 1967, Ser. No. 663,480
Int. Cl. G01n 23/04, 23/20; G03b 41/16
U.S. Cl. 250—66                                    7 Claims

ABSTRACT OF THE DISCLOSURE

A cylindrical X-ray cassette having an axial slit for removably receiving therewithin an envelope containing Polaroid film. A polymer film coating is applied to the interior cassette wall surface for forming opposite static electrical charges on the film and wall surface and thereby provide strong mutual attraction therebetween. Two or more collimator and trap pairs, each separately shielded with a light-tight shield, are axially aligned within the cassette to provide X-ray exposure of both known and unknown crystal specimens on a single film, and to also enable the taking of single crystal rotation photographs. The cassette is further equipped with a rotatable cap element having a film-engaging and operating arm, and adjustable between a first, film-exposing position and a second position withdrawing the film from inside the cassette.

CROSS-REFERENCE TO RELATED APPLICATIONS

In the production of diffraction patterns of powdered samples and of rotating single crystals, the spherical goniometer head supported on the X-ray double yoke disclosed in the Frank L. Chan Pat. Nos. 3,160,748 and 3,230,367 is preferred as the crystal mount.

BACKGROUND OF THE INVENTION (1) The field of the invention is in laboratory X-ray photographic instruments that display accurately the space lattice distribution, dimensions and related parameters of the atoms and molecules in crystals of inorganic and organic compositions inclusive of metallurgical and of biological samples in adaptations of photographic image presentations with optimum time conservation.

(2) The description of the prior art in X-ray crystallography that provides accurate parameters in three-dimensional planes of reference in compositions of matter is accomplished by the impressing of X-ray energy upon the matter from which reflected, visible light imparts a pattern on the film within a cylindrical cassette on the axis of which the matter is rotatably mounted in an X-ray beam, such illustratively as in the Frank L. Chan Pat. No. 3,069,500. Prior X-ray film cassettes are disclosed in the Pats. Nos. 3,271,571; 3,240,936; 3,174,039; 3,153,145, etc.

In the prior field of dry process X-ray crystallography, the commercially available X-ray cassette commonly has been flat with limitations in structure, in use, and in results with particular emphasis on optical properties, over which the instrument or apparatus that is disclosed herein has many very important material advantages.

With the cylindrical cassette, the effective diameter is fixed and is maintained constant. Therefore the interplanar spacing $d$ of a crystal or a powdered sample to be investigated can easily be calculated from Bragg's Law; namely, $n\lambda = 2d \sin \theta$ wherein $\lambda$ is the X-ray wavelength from the target material, $\theta$, the angle at which the X-rays are cooperatively reflected, is easily obtained from the powder pattern or single crystal rotation taken by the camera described herein, as also can the value of $d$ since $d$ is calculated from $\lambda$ and $\theta$.

SUMMARY OF THE INVENTION

The nature, the substance and the objects of the present invention are in its nature a new and improved laboratory X-ray photographic instrument for determining the distribution of atoms in the space lattice of crystals and the like; in its substance a metal device comprising a cylindrical capped cassette that is slotted axially to receive films fed to and withdrawn from the cassette by the rotation of the cap thereof in producing in three minutes dry process accurate pictures wherein recorded images are precisely spaced a single radial distance from the corresponding objects; and the objects of the present invention are the provision of improved time, effort and accuracy enhanced apparatus for use in the practice of X-ray crystallography.

The accuracy concerns $K\alpha_1$ and $K\alpha_2$ on the back reflection side of the photograph. A further object is to provide pictures that present over twice the area presented by Laue pictures and of far greater accuracy. For single crystal photographs, the films are 50 mm. wide which is sufficient to intercept first, second and third layer diffraction spots.

BRIEF DESCRIPTION OF THE DRAWINGS

The structure of an apparatus that embodies the present invention is illustrated in the accompanying drawings wherein:

FIG. 1 is an elevational view of one side of the apparatus;

FIG. 2 is an elevational view of the opposite side of the apparatus that is shown in FIG. 1;

FIG. 3 is a plan view from above of the apparatus shown in FIGS. 1 and 2;

FIG. 4 is a plan view from above and partly broken away and in section from the line A—A in FIG. 1 of the cassette shown in FIGS. 1 through 3 with the cassette cap removed with the film end bead initially engaged to be drawn into the cassette by the rotation of the cap and with the inside collimator and trap just reversed from their position when an exposure of the film is made;

FIG. 5 is a sectional view taken along the line 5—5 of FIG. 4;

FIG. 6 is an enlarged elevational view, partly broken away and in section, of an inside spring-loaded, radially adjustable collimator with screw adjustable target and a film end bead engaging blade within the cassette;

FIG. 7 is an enlarged fragmentary view partly broken away and in section of the wedge in FIG. 6 elevated; and FIG. 8 is a fragmentary view partly broken away and in section showing a modified slot for engaging the film bead.

DESCRIPTION OF THE PREFERRED EMBODIMENT

In FIGS. 1, 2 and 3 of the accompanying drawings, the apparatus contemplated hereby comprises broadly a rectangular film holder 1 with one end opening into an axially extending slot through the side of a cylindrical cassette 2 about diametrically remote from a collimator 5, all mounted on a base 3 that is secured by a plurality of assembly attaching screws 4 on a commercially available supporting and crystal operating equipment such as that shown. The illustrated film holder and cassette supporting apparatus comprises a motor housing 6 energized from an electric connector socket 7 and resting upon a yoke 8 and attaching plate 9 through which the screws 4 thread. A film clamp operating knurled cap 16 and a view finder 36 are threaded into the wall of the cassette 2′ to be available from outside the assembly.

The film holder 1 shown in FIG. 4 comprises a shallow metal housing 1′ with one end remote from the cassette available for the removable insertion therein of a film envelope 19 containing a film 18. A successfully operative, rapidly developed film is available commercially. The attached end of the film housing 1′ fits into an axially extending slit through the side wall of the cassette 2′ to which the film housing 1′ is secured with metal straps 34 and 35 overlying resilient light-tight seal material 37 and 38, respectively, of sponge rubber or the like. The unattached end of the film housing 1′ preferably is provided with a LOAD and PROCESS lever arm 17 for spacing a pair of spring-loaded rollers away from each other during film loading and moving the rollers toward each other as the quickly developed exposed film is withdrawn in its envelope from the housing during the film developing and fixing operation.

The cylindrical cassette 2′ is hollow and is closed from above by a removable cap 10 as illustrated in FIGS. 1 through 3. The cap 10 has a peripheral flange 11 depending from its edge and externally milled. The cap flange 11 overlies an upwardly extending inner flange 12 of the wall of the cassette 2′ in light-tight engagement therewith. A cap releasing and locking set screw 13 threads through the cap flange 11 to bear against the cassette flange 12 in arresting the rotation of the cap at a desired fixed position.

With the set screw 13 released an oval index 14 on the lower edge of the knurled outer surface of the cap flange 11 is brought into registration with the indicator F on the upper edge of the outer side of the cassette 2′ by the manual rotation of the cap 10 when film is to be inserted into or is withdrawn from the cassette and is brought into registration with the indicator P on the upper edge of the cassette 2′ when a picture is to be taken.

The cylindrical X-ray cassette 2′ that is illustrated in FIGS. 4, 6 and 7 of the accompanying drawings is characterized by two radially alignable X-ray energy-conducting collimators, an outer collimator 5 and a second collimator 20 inside of the cylindrical cassette. The inside collimator 20 is attached by a strap 21 and screws 22 to its support 23. Light scattering on the film is minimized by the least possible space between the ends of both collimators and the film. The support 23 rests on the bottom of the inside of the cassette 2′ and its upper face contains a pin socket 65 for the removable insertion in the socket of a pin 49 that depends from and is secured in the cap 10 such that the rotation of the cap 10 rotates the support 23 and tht equipment that is attached thereto.

The wall of the inside collimator 20 is slitted axially for the disposition in the slit of a wedge 24 welded to a rod 25 as indicated in FIGS. 4, 6 and 7 of the drawings. The rod 25 is axially movable in one or more straps 26 attached by screws 27 to the support 23. The inside collimator 20 is spring-loaded by a spring 28 yieldingly held in compression between a flange 29 on the collimator end remote from the inclined edge of the wedge 24 and the inside collimator supporting strap 21, thereby maintaining firm sliding contact between the collimator 20 and the inclined edge of the wedge 24 at all times. The rod 25 extends upwardly through the cap 10 in light-tight manner as by a strap seal 32 that is secured to the cap by screws 33. The rod 25 is operated from above the cap from a peripherally milled or knurled collimator adjusting knob 30 that is secured to the upper end of the rod by a set screw 31 for the controlled axial displacement of the rod 25 in the adjustment of the inside collimator 20 radially of the cassette 2′. The inside collimator 20 is in alignment with an apertured inside target 55 that is supported by a strap 60 attached by screws 61 to the support 23. The inner and outer collimators 20 and 5 at their point of nearest proximity are contoured to minimize X-ray scattering between them. The target 55 has a screwdriver slot in its end and is threaded in its mount strap 60 for its adjustment in close proximity with the film for minimized X-ray scattering.

The view finder comprises a high lead content glass window diaphragm within a brass cap 36 that threads on a hollow shaft 76 that threads through the side wall of the cassette 2′ diametrically remote from the collimator 5. The view finder permits the correction of the alignment from outside of the assembly of the collimators and the trap with the crystal 71 in between. When the crystal 71 is exposed to an X-ray beam, the beam passes through the collimators 5 and 20, the crystal 71, the trap 55, the hollow shaft 76 and the window of the view finder 36. The slot that extends axially of the inside collimator 20 to accommodate the wedge 24 is laterally displaced adequately to leave the collimator bore unimpeded for sighting through the window diaphragm of the view finder 36.

A second knurled film bead-engaging knob 40 on the top of the cassette cap 10 in FIGS. 1, 2, 3 and 6 terminates downwardly in a pin that seats in either of two depressed punch marks, such as the punch mark 70, in the top surface of the cap 10 at the movable end of an arm 41 that was a heavy base 42. A set screw 43 threads radially into the heavy base 42 and secures a film controlling rod 45 in the base 42. The rod 45 extends downwardly through the cap 10 and is welded along a part of its length to a yoke blade 46 and is journalled near its base in a strap 47 that is secured by screws 48 to the support 23.

In one position, the yoke blade 46 engages the film end bead 50 for both drawing the film into and removing the film from the interior of the cassette by the rotary operation of the cassette cap 10. A spring cover 51 pivoted on the screw 52 overlies the tops of the base 42 and the rod 45. Ready access into the interior of the cassette 2′ is provided by a manhole cover 53 that is secured to the cassette cap 10 by screws 54 or the like.

In FIGS. 4 through 7 of the drawings, the cylindrical interior of the cassette 2′ contains a pair of axially spaced brass cylindrical collars 56 and 57 secured by screws or the like to the top and the bottom, respectively, of the cassette interior. The brass collars have edge slits for the passage of the film therethrough. Axially between the pair of brass collars 56 and 57 is a white split collar fluorescent screen 58 that has one of its ends attached by the screws 59 to the inner surface of the cassette and its opposite end is attached about axially midway of the cassette by the screw 62 to a necked cam-surface plunger member 63 into the remote end of which a rod 64 threads. The end of the rod 64 that is remote from the plunger 63 threads through a cap 16 that has a knurled surface for providing a finger grip.

The rod 64 makes a sliding fit through an externally threaded hollow bolt 66 that threads tangentially through the wall of the cassette 2′ as shown and that compresses a coil spring 67 between the cam plunger member 63 and the end of the bolt 66 spaced from the cam plunger member. The bolt 66 end that is adjacent to the cap 16 is clutch-stepped at 68 as shown, such that when the cap 16 is drawn away from the hollow bolt 66 and is partially rotated, the gap between the ends of the white fluorescent screen 58 is increased and the cam plunger 63 slides from beneath the cassette cap 10 locking axially extending rod 69 that moves freely axially through a bore in the cassette wall. The rod 69 movably slides axially of the cassette wall upwardly into a cap locking socket in the lower surface of the cassette cap 10 when the rod is on the riser of the cam plunger 63 and recedes below the upper cassette rim surface when the lower end of the rod 69 rides lowermost of the cam plunger member 63 as the film clamp cap 16 is pulled out and is partly rotated to position the lower end of the cap locking rod 69 low on the cam plunger member 63. With the retracted cam plunger member 63 attached to the movable end of the white fluorescent screen 58, the screen is moved radially away from both of the brass split collars 56 and 57 adequately to permit the film 18 to be advanced between the white collar and the pair of brass collars. The white collar 58 is a film carriage fluorescent screen that converts incident X-ray energy into light energy that exposes photographic film.

As shown in FIGS. 1 through 5 of the drawings, on the top of the cap 10 the film bead 50 engaging control knob 40 is moved clockwise over to the socket 70 to cause the blade 46 shown in FIG. 4 to just pass the laterally projecting knife-edge of the steel strip of the film end bead 50 as the film is placed slightly in thrust to assure its engagement with the steel strip. The position 70 of the film controlling knob 40 is the locked-in position of the knob that is retained through the film exposure.

The cap 10 set screw 13 is released so that the cap may be freely rotated. The oval indicator on the side of the cap flange 11 is placed in registration with the letter F on the side of the cassette 2' as the first position of the cap 10.

Except when a picture is being taken the cap 16 is always pulled out and partially rotated to drop the pin 69 to the low spot on the cam 63. This increases the distance between one fixed end of the white collar fluorescent screen 58 that is secured by the screws 59 and the movable opposite end that is secured by a screw 62 to the cam surfaced plunger 63. This increases the space between the pair of brass collars 56 and 57 and the white collar fluorescent screen 58 for the admission of the film therebetween, as indicated in FIGS. 4 and 5. Slits in the brass collars accommodate the film. The envelope 19 is pulled out about ¾ inch then as the cap 10 is rotated counterclockwise, the film 18 is drawn out of its envelope 19 and is positioned between the pair of brass split collars 56 and 57 on one side and the white split collar fluorescent screen 58 on the other side of the film. The film then is positioned fully within the cassette 2' with the oval 14 above the letter P when the cap set screw 13 is tightened.

The film clamp cap 16 is then released to apply the fluorescent screen tightly on the film negative. The X-ray exposure is then made and the crystal lattice image is impressed on the film negative. On the application of X-ray energy to the crystal sample, and the conversion of the X-ray energy into visible light energy by the fluorescent screen 58, the sample pattern is impressed on the film negative within the cassette.

The cap set screw 13 is loosened and the cap 16 is then pulled out and partially rotated to release the film 18 from between the axially spaced pair of upper and lower brass collars 56 and 57, respectively, and the white collar fluorescent screen 58. The cap 10 is then rotated clockwise to return the exposed film negative fully back into its envelope.

With the exposed film again inside its envelope, the Load and Process lever arm 17 in FIG. 1 is moved to the Process position and the film negative is developed and fixed by being drawn manually between the pair of rollers that release the photographic reagents within the envelope and against the film negative and in a matter of ten seconds the permanent picture is removed from its envelope.

A modified film movement control device is shown in FIG. 8 as an axially slotted sleeve 72 operated from a finger-grip 73 to move axially through the cassette cap 10. The sleeve 72 is positioned within the rubber sleeve 74 in light-tight contact with a nipple 75 attached to the cap 10. The sleeve 72 is pressed or slid down from above over the film end bead 50 and the film bead in the slot such that the sleeve 72 moves the cap 10 for positioning the film within and withdrawing the film from the cassette and then the sleeve 72 is lifted from the film when the cap is back in its original position.

It is to be understood that the parts of the apparatus that are disclosed and described herein have been submitted as being illustrative of an operative embodiment of the present invention and that limited modifications may be made therein without departing from the spirit and the scope of the present invention as defined by the subjoined claims.

I claim:

1. A cylindrical X-ray cassette apparatus comprising a hollow, cylindrical cassette having a wall with an axial slit through the wall, a rotatable cap removably closing the top of the cassette and for loading and unloading the cassette with film, a plurality of collimators comprising at least one collimator positioned on the cassette inside wall surface and mounted radially of at least one collimator mounted on the cassette outside wall surface and extending through the wall in axial alignment with said first-named collimator, a view finder means mounted through the wall of said cassette at a position thereof diametrically remote from the said collimator positioned on the cassette inside wall surface, said view finder means optically permitting the alignment of the said collimators with a sample crystal within the cassette, means adjustable through the cassette cap for moving one of the collimators with respect to another of said collimators radially of the cassette, a film holder sealing the cassette axial slit in light-tight engagement in providing a film for the cassette, cassette cap operated means for positioning the film within and removing the film from the interior of said cassette and thereby respectively moving the film from and into said film holder, film clamping means for releasably binding the film against the inside surface of the cassette from outside thereof preparatory to its exposure, and an apertured target supported on the inside cassette wall surface and thereby being positioned in optical alignment with said collimators, said target being further adjustably mounted to its support for adjustment to a position in close proximity to the film for thereby minimizing X-ray scattering, said cassette further having means forming a pair of opposing cylindrical slots spaced apart a distance equal to the film width and extending around the interior of said cassette in alignment with the said axial slit thereof to thereby provide support for said film in its film-exposing position, and a fluorescent screen carried by said film clamping means and held in tight-fit relation thereby on said film for converting incident X-ray energy into light energy exposing said film.

2. The apparatus defined by claim 1 wherein the sample crystal is rotatably mounted along the axis of the cylindrical cassette.

3. The apparatus defined by claim 1 wherein a set screw secures the cassette cap in a desired position.

4. The apparatus defined by claim 1 wherein the film clamping means arrests and releases the cap for its rotation on the cassette.

5. The cassette apparatus defined by claim 1 wherein the cassette contains a collimator mount rotatable within the cassette by a pin-in-socket releasable union between the cassette cap and the collimator mount.

6. The apparatus defined by claim 1 wherein the exposed film is developed and finished by being drawn between a pair of spring-loaded rollers respectively actuated between relatively wide apart film-loading and close together film-processing positions by the resilient contact thereof with, and operation by, an actuating load and process lever means positioned at the end of said film holder remote from said cassette.

7. The apparatus defined by claim 1 wherein the cassette cap operated film positioning means comprises an axially slotted sleeve operated from a fingergrip to move axially through the cassette cap in light-tight contact therewith to insert a film end bead in the slot for moving the film in and removing the film from the cassette.

References Cited

UNITED STATES PATENTS

| 2,584,962 | 2/1952 | Gross | 250—51.5 |
| 2,925,761 | 2/1960 | Peary et al. | 250—68 X |
| 3,230,367 | 1/1966 | Chan | 250—68 |

WILLIAM F. LINDQUIST, Primary Examiner

U.S. Cl. X.R.

250—51.5, 65, 68